United States Patent
Allam et al.

(10) Patent No.: US 11,811,736 B2
(45) Date of Patent: Nov. 7, 2023

(54) GENERATING NETWORK INFASTRUCTURE FIREWALLS

(71) Applicant: CERNER INNOVATION, INC., Kansas City, KS (US)

(72) Inventors: Chandrika Allam, Bangalore (IN); Jose Pulickal, Kerala (IN); Priyanka Bandaru, Guntur (IN); Neha Bhandari, Bangalore (IN); Ravindra Gadad, Hubli (IN); Dhananjay Gawali, Bangalore (IN); Pravat Santra, Bangalore (IN); John Moratelli, Kansas City, KS (US); Kevin Hurst, Kansas City, KS (US); John Ulmer, Kansas City, KS (US)

(73) Assignee: Cerner Innovation, Inc., Kansas City, MO (US)

( * ) Notice: Subject to any disclaimer, the term of this patent is extended or adjusted under 35 U.S.C. 154(b) by 148 days.

(21) Appl. No.: 17/375,869

(22) Filed: Jul. 14, 2021

(65) Prior Publication Data
US 2022/0210128 A1   Jun. 30, 2022

Related U.S. Application Data

(60) Provisional application No. 63/132,794, filed on Dec. 31, 2020.

(51) Int. Cl.
*G06F 21/00* (2013.01)
*H04L 9/40* (2022.01)

(52) U.S. Cl.
CPC ................................ *H04L 63/0263* (2013.01)

(58) Field of Classification Search
CPC ....................... H04L 63/0263; H04L 63/0236; H04L 63/101
See application file for complete search history.

(56) References Cited

U.S. PATENT DOCUMENTS

| 11,240,205 | B1 * | 2/2022 | Ramesh | H04L 63/101 |
| 2007/0209058 | A1 * | 9/2007 | Anantharamiah | H04L 63/0227 726/1 |
| 2010/0332630 | A1 * | 12/2010 | Harlow | H04L 41/048 709/224 |
| 2013/0246470 | A1 * | 9/2013 | Price | G06F 16/13 707/783 |
| 2019/0273719 | A1 * | 9/2019 | Parekh | H04L 45/745 |
| 2019/0312775 | A1 * | 10/2019 | Patil | H04L 41/085 |
| 2020/0358744 | A1 * | 11/2020 | Lee | H04L 63/0236 |

FOREIGN PATENT DOCUMENTS

CN    109547502 A   *   3/2019

* cited by examiner

*Primary Examiner* — Michael M Lee
(74) *Attorney, Agent, or Firm* — Invoke (57) ABSTRACT

Systems, methods, and storage media useful in a computing platform to automatically generate and deploy access control list (ACL) rules for one or more firewalls in a data center are provided. The computing platform is vendor-agnostic and generates ACL rules in multiple syntaxes depending on the firewall needing updating. The platform traverses a data center mapping structure to identify one or more firewalls to be updated for a destination IP address and source IP address and automatically generates the ACL rule in the syntax for the one or more firewalls identified.

26 Claims, 7 Drawing Sheets

ACL GENERATOR

TICKET NUMBER: CRQ00000334599O

REQUEST TYPE: CER_PA

SOURCE IP:

DESTINATION IP:

PROTOCOL: TCP

PORT NUMBER:

SUBMIT

*FIG. 6.*

- (ASA) IS REACHABLE

- (ASA) IS REACHABLE

- (ASA) IS REACHABLE

*FIG. 7.*

GENERATING NETWORK INFASTRUCTURE FIREWALLS

CROSS-REFERENCE TO RELATED APPLICATIONS AND PRIORITY CLAIM

This application claims the benefit of co-pending U.S. Provisional Patent Application No. 63/132,794, filed Dec. 31, 2020, entitled "Generating Network Infrastructure Firewalls," the entire contents of which is incorporated herein by reference.

BACKGROUND

Network security, such as firewalls, monitor and control incoming and outgoing network traffic utilizing security rules. The security rules establish a barrier between a trusted network and untrusted networks.

Hardware firewalls are configured to allow/deny ingress and egress to servers and data centers. Typically, ingress and egress are controlled by access control lists (ACLS) that define the conditions to permit and deny external access to servers and data centers. Currently, configuration of ACLs is configured and tested manually by a programming engineer responsible for implementing security rules.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present disclosure is defined by the claims as supported by the Specification, including the Detailed Description.

Systems, methods, and storage media useful in a computing platform to automatically generate and deploy access control list (ACL) rules for one or more firewalls in a data center are provided. The computing platform is vendor-agnostic and generates ACL rules in multiple syntaxes depending on the firewall needing updating. The platform traverses a data center mapping structure to identify one or more firewalls to be updated for a destination IP address and source IP address and automatically generates the ACL rule in the syntax for the one or more firewalls identified.

BRIEF DESCRIPTION OF THE DRAWINGS

Illustrative aspects of the present invention are described in detail below with reference to the attached drawing figures, and wherein.

DETAILED DESCRIPTION

The subject matter of the present invention is being described with specificity herein to meet statutory requirements. However, the description itself is not intended to limit the scope of this patent. Rather, the inventors have contemplated that the claimed subject matter might also be embodied in other ways, to include different operators or combinations of operators similar to the ones described in this document, in conjunction with other present or future technologies. Terms should not be interpreted as implying any particular order among or between various operators herein disclosed unless and except when the order of individual operators is explicitly described. As such, although the terms "operator" and/or "block" can be used herein to connote different elements of system and/or methods, the terms should not be interpreted as implying any particular order and/or dependencies among or between various components and/or operators herein disclosed unless and except when the order of individual operators is explicitly described. The present disclosure will now be described more fully herein with reference to the accompanying drawings, which may not be drawn to scale and which are not to be construed as limiting. Indeed, the present invention can be embodied in many different forms and should not be construed as limited to the aspects set forth herein. Further, it will be apparent from this Detailed Description that the technological solutions disclosed herein are only a portion of those provided by the present invention. As such, the technological problems, solutions, advances, and improvements expressly referenced and explained herein should not be construed in a way that would limit the benefits, improvements, and/or practical application of the discussed aspects of the present invention.

As one skilled in the art will appreciate, embodiments of the invention may be embodied as, among other things: a method, system, or set of instructions embodied on one or more computer readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer-readable media, as discussed further with respect to FIG. 1.

Access Control Lists (ACLs) are a collection of permit and deny conditions for inbound and outbound data from a data center. An ACL specifies which users or system processes are granted access to servers in a data center as well as the permission levels. Inbound firewall rules define the traffic allowed to a server in the data center from ports and sources. If no inbound rules are configured, no incoming traffic is permitted. Outbound firewall rules define the traffic allowed to leave a server in the data center on to ports and destinations. When a server internal to a data center needs to communicate data to one or more servers external to a data server, multiple firewalls may need to be traversed to permit this communication and vice versa.

Currently, a programming engineer manually configures the ACLs to permit or deny this communication. The programming engineer needs extensive knowledge of the data center and firewalls to implement and update new configurations of firewalls. As ACLs and security policies are continuously being updated, this requires significant time investment to properly code and test the firewall configuration.

Furthermore, a data center may have a diverse security environment with multiple vendor hardware firewalls, with different programming, features and syntax. To maintain security in this environment, a programming engineer needs to be able to configure ACLs for different vendor hardware firewalls within a data center and requires knowledge of different code versions, features, and syntax for each firewall.

For the healthcare data industry, firewall compliance is very important to maintain security of sensitive medical information. Audits are performed on a regular basis to ensure security is maintained, requiring additional manual documentation by a programming engineer.

Programming engineers must have knowledge of the network infrastructure when implementing updated firewall configurations. Even experienced programming engineers cannot keep up with firewall infrastructure changes and updates within a large data center. Maintaining firewall inventory and updates across firewall vendors for firewalls deployed across a data center for real-time configurations is a difficult and time-consuming task. Furthermore, as additional clients begin to communicate with the data center ("go-lives"), thousands of additional manual configurations are manually made to firewalls every year.

Prior to platform 102, updating firewall rulesets for clients was done manually by engineers and was error-prone. For example, if inbound and outbound IP addresses were being added for a client, an engineer would have to locate the firewall for each IP address separately, for both inbound and outbound communication. Once the firewall was identified, a programming engineer would manually write firewall configuration rules for each IP address in the syntax of the identified firewall. This required a lot of time, syntax knowledge for each vendor, type and update of a firewall, and time for the engineers to process multiple IP addresses for a variety of firewalls. This manual configuration process took a programming engineer 30 minutes to 24 hours depending on complexity of the firewall configuration rules. After writing the firewall rulesets in the proper firewall syntax, the engineer would then manually validate and document the changes to the firewall configuration for security auditing purposes.

Firewall management tools provided by vendors have limited functionality. Vendor specific management software only works on vendor hardware and is unable to manage a data center infrastructure which has firewalls from different vendors with different updates and syntax.

Platform 102 improves the technology and security of data center 205 infrastructure. The platform 102 automatically generates firewall rulesets in the proper syntax to process network infrastructure requests while being assisted by the intelligent discovery modules. Platform 102 collates the list of firewalls deployed in data center 205, analyzes parameters of the proposed connection (IP addresses), automatically identifies the firewall and generates a firewall configuration and ruleset to be implemented on the firewall to permit this connection. Platform 102 further assists with auditing requirements and firewall simulation.

Figure 2:
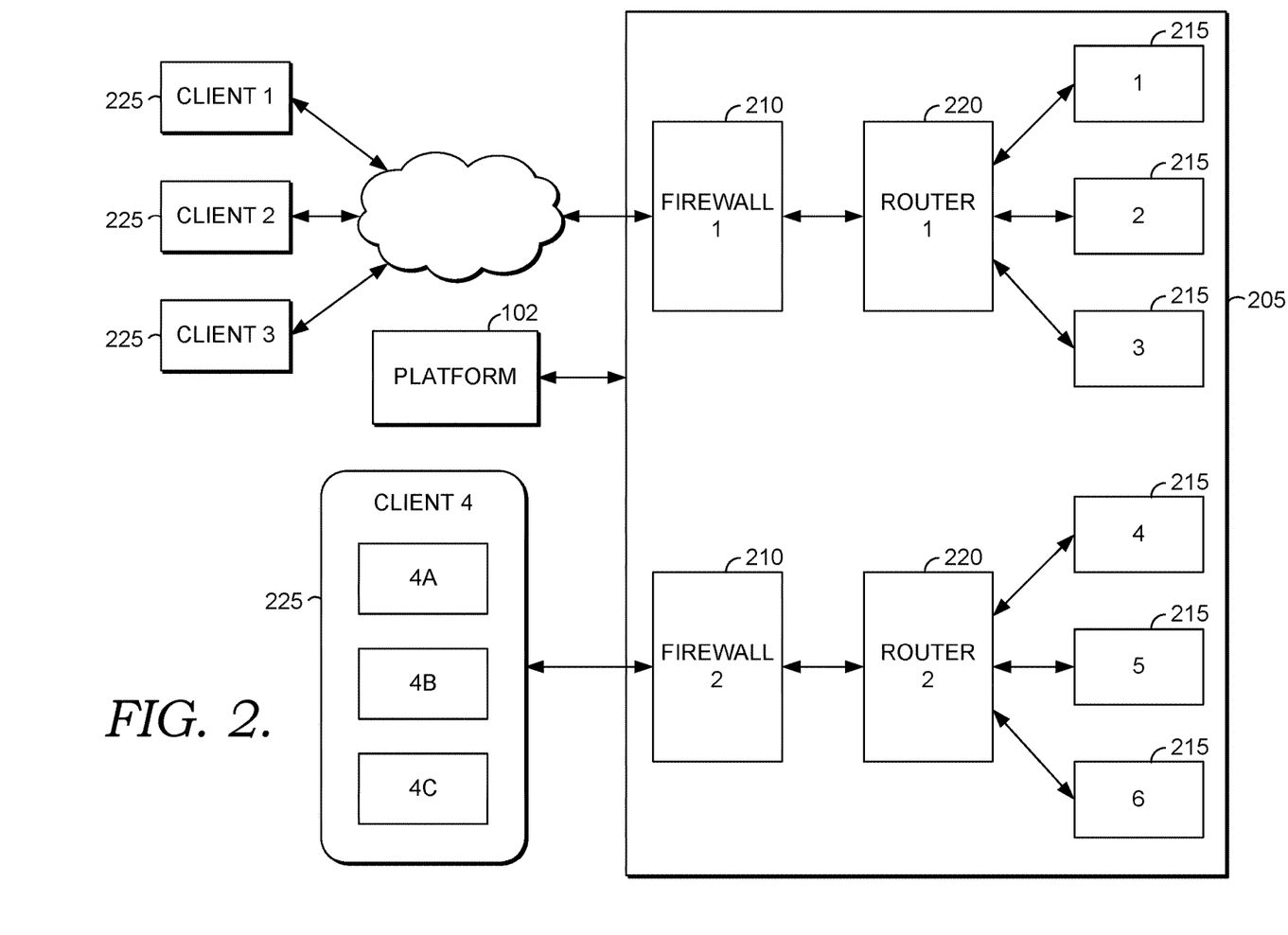
FIG. 2 depicts a data center, in accordance with aspects of the invention.

Platform 102 is in communication with data center 205 of FIG. 2. Data center 205 hosts servers 215 and routers 220. Data center 205 may also include load balancers and switches (not shown). Data center 205 is in communication with clients 225 and controls solutions and data provided to clients 225 and load balancing. Exemplary clients may include hospitals and healthcare systems utilizing an electronic medical record system controlled by data center 205.

Data center 205 may host tens of thousands of physical and virtual servers and hundreds of routers 220 and firewalls 210 to service hundreds of clients 225. The access of a client 225 through WAN/VPN and/or Internet is restricted and controlled using virtual and physical firewalls 210 deployed strategically to ensure that each client connection is subjected to firewall inspection. In one embodiment, hardware firewalls 210 are located before routers 220 and servers 215 such that client 225 connections and data is inspected before being routed by routers 220 to servers 215 in data center 205. Routers 220 may be any type of routers 220, including VLAN's deployed across the data center 205. Exemplary hardware firewalls 210 include Cisco ASA®, Cisco ASA® to Cisco Palo Alto® firewalls. It will be appreciated that firewalls 210 utilized for data center 205 may be any type or vendor of hardware or virtual firewalls. Firewalls may have unique syntax based on the vendor, software version, and updates made to each individual firewall.

Data center 205 security standards follow 'Zero-Trust' principle with multiple security layers. The implementation of network layer security uses network firewall devices 210 deployed in data center 205. The firewall devices 210 enforce this control by inspecting the network packets and comparing it to the different features and security policy rules configured within the firewall 210. Data center 205 utilizes layered security enforcements, including granular L3/L4 rules to provide ingress and egress for permitted clients 225.

In one embodiment, a hardware firewall 210 is located in front of or before a single router 220 routing to multiple servers 215. In this embodiment, a firewall 210, router 220, and servers 215 are separate from the rest of firewalls 210, routers 220, and servers 215 in data center 205. For example, in FIG. 2, firewall 1 is front of router 1 that routes client data for clients 1, 2, and 3 to and from servers 1, 2, and 3. Firewall 2 is in front of router 2 that routes client data for client 4 to and from servers 4, 5, and 6. In this instance, the data from client 4 is kept completely separate from data for clients 1, 2, and 3 even though the data for all clients in maintained in data center 205. This adds an additional level of security for client data in a sensitive environment.

Firewalls 210 enable monitoring and control of network traffic flowing through data center 205. Security standards for firewalls 210 may be audited under SOC Audit Requirement/Compliance for L3 Security. The implementation of network layer 3 and 4 security is done using firewalls 210 deployed in data center 205. It will be appreciated any layer of security and audits may be employed for firewalls 210 in data center 205 as firewall security evolves. The firewall 210 enforces ingress and egress by client by inspecting the network packets and comparing it to the different features and security policy rules configured within the firewall 210.

Figure 1:
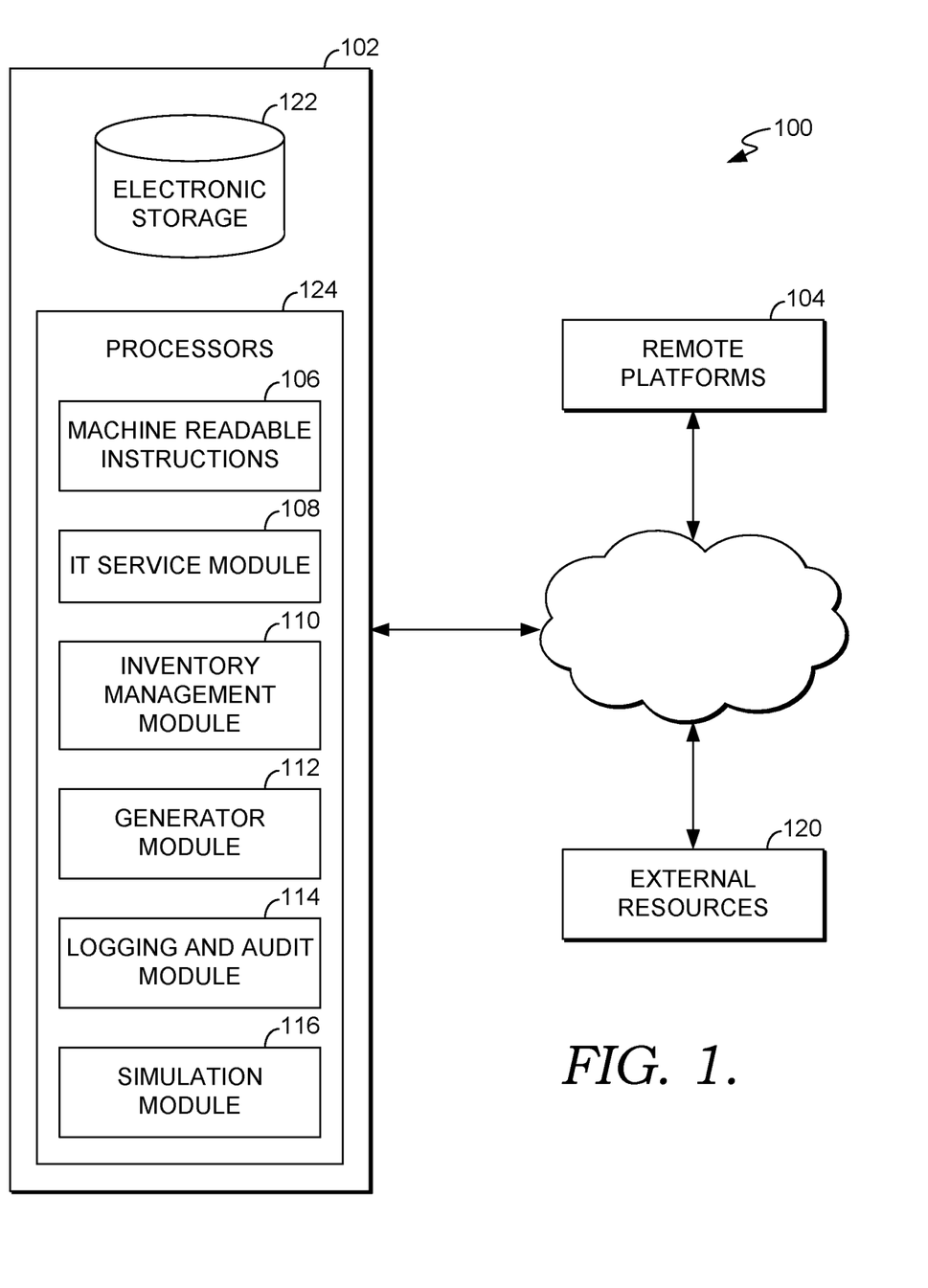
FIG. 1 illustrates a computing platform, in accordance with aspects of the invention.

FIG. 1 illustrates a system configured to be useful in a computer system 100 to improve security of a network infrastructure. The system 100 automatically generates firewall rulesets to process network infrastructure requests, in accordance with one or more implementations. In some implementations, system 100 may include one or more computing platforms 102. It should be appreciated that although modules 108, 110, 112, 114, and/or 116 are illustrated in FIG. 1 as being implemented within a single processing unit, in implementations in which processor(s) 124 includes multiple processing units, one or more of modules 108, 110, 112, 114, and/or 116 may be implemented remotely from the other modules. The description of the functionality provided by the different modules 108, 110, 112, 114, and/or 116 described below is for illustrative purposes, and is not intended to be limiting, as any of modules 108, 110, 112, 114, and/or 116 may provide more or less functionality than is described. For example, one or more of modules 108, 110, 112, 114, and/or 116 may be eliminated, and some or all of its functionality may be provided by other ones of modules 108, 110, 112, 114, and/or 116. As another example, processor(s) 124 may be configured to execute one or more additional modules that may perform some or all of the functionality attributed below to one of modules 108, 110, 112, 114, and/or 116.

Computing platform(s) 102 may be configured by machine-readable instructions 106. Machine-readable instructions 106 may include one or more instruction modules. The instruction modules may include computer program modules. The instruction modules may include one or more of IT Service module 108, inventory management module 110, generator module 112, logging and audit module 114, and simulation module 116, and/or other instruction modules.

In one embodiment, computing platform 102 is built on a developer framework, such as Django for Python, utilizing restful application programming interfaces (API). Django framework and Restful framework provide a solution that is scalable and secure with the ability for modules of platform 102 to communicate using APIs. It will be appreciated that platform 102 may be built on any variety of developer frameworks.

Platform 102 supports multiple different vendor hardware firewalls, virtual firewalls, syntax, updates, and firewall configurations within data center 205. Each firewall in data center 205 may have a different update, configuration, and syntax. Platform 102 is scalable, flexible, and able to update and change ACLs for firewalls in real-time. Platform 102 manages thousands of security service requests for inbound and outbound communication with hundreds of clients to and from data center 205. Platform 102 automatically updates firewall ACLs and simulates, documents, and validates communications between the data center and hundreds of clients.

IT service module 108 is configured to receive network infrastructure requests. For example, an infrastructure request ticket may be submitted to IT service module 108 listing IP addresses for security configuration. As discussed above, IT service module 108 may collect data to add, delete, and/or update ACL rulesets for servers in a data center.

Information in the infrastructure ticket requests to add to, delete, and/or update ACLs may include source IP address, destination IP address, layer, permissions, and port information. A destination IP address for a client may be added or removed from a source IP address of a server in a data center by managing the ACLs for the server in the data center. If a new client is being added to a server in a data center, a number of destination IP addresses may be given access to servers with source IP addresses in the data center. Furthermore, if a client was undergoing a hardware update, some destination IP addresses may be added or removed from having data center access.

Inventory management module 110 is an IP management tool that runs recursively to discover and document hardware firewalls, virtual firewalls, routers, servers, software, and other hardware in the data center. Inventory management module 110 makes and maintains a map of the data center. Inventory management module 110 continuously scans the network environment of the data and provides live information for firewalls deployed in the data center. Inventory management module 110 ensures the reachability of firewalls through the network of the data center and detects which data center segment to which a firewall belongs. Once a firewall is reached, the required firewall code information is collected from the firewall and saved. Inventory management module 110 creates data center mapping structure in electronic storage database 122 with relevant data structures to store the required fields to maintain the mapping and information for the firewalls in the data center. The information collected by inventory management module 110 is used to build the data center mapping structure and includes the syntax-semantics which is applicable to each particular firewall along with the location information. Inventory management module 110 maintains firewalls, firewall vendors, updates, syntax, and configurations in the data center mapping structure in electronic storage database 122.

Electronic storage database 122 also includes client rules and preferences for managing and communicating data to and from data center 205. For example, a client may have particular rules for managing and communicating data to and from data center 205. For example, in FIG. 2, client 4 rules require its data in data center 205 to remain separate from other clients, such as clients 1, 2, and 3. Additional client rules and preferences may include communication protocol and encryption techniques.

Figure 5:
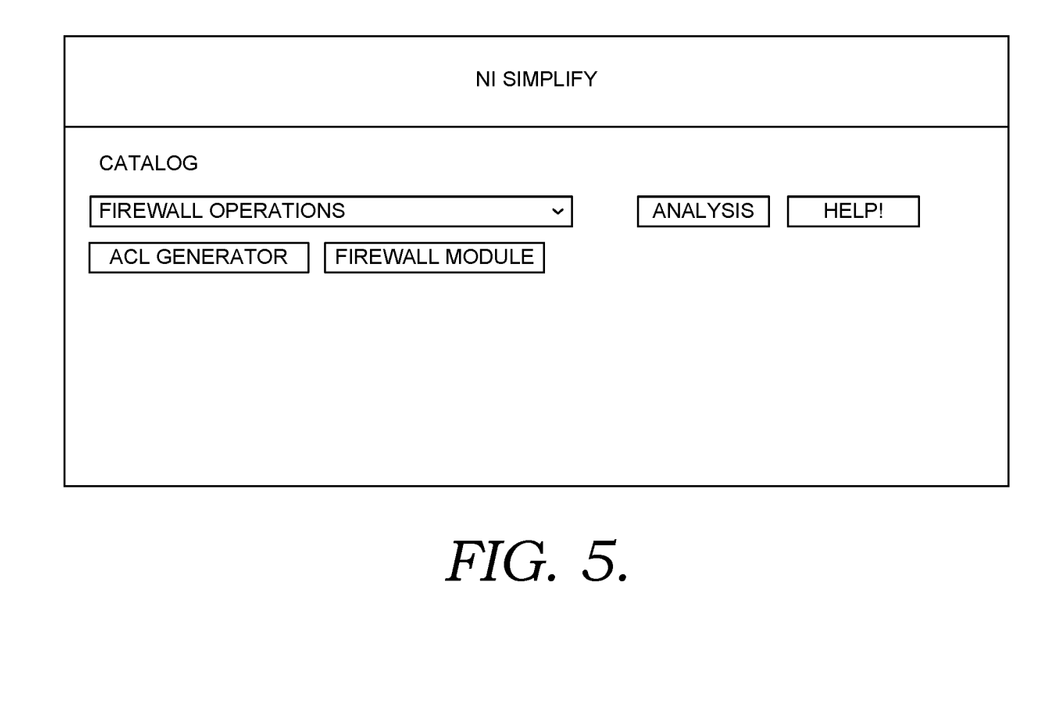
FIGS. 5, 6, and 7 depict exemplary graphical user interfaces for receiving source and destination IP addresses and identifying the associated firewall, in accordance with aspects of the invention.

When the ACL for one or more firewalls is requested to be changed or updated, data from IT service module 108 is communicated to inventory management module 110. With reference to FIG. 5, the source IP address, destination IP address, port information, and associated permissions to be added, deleted, or updated are communicated from IT service module 108 to inventory management module 110. Utilizing the data center mapping structure stored in electronic storage 122, inventory management module 110 begins traversing the data center mapping structure starting at the source IP address toward the destination IP address.

Figure 6:
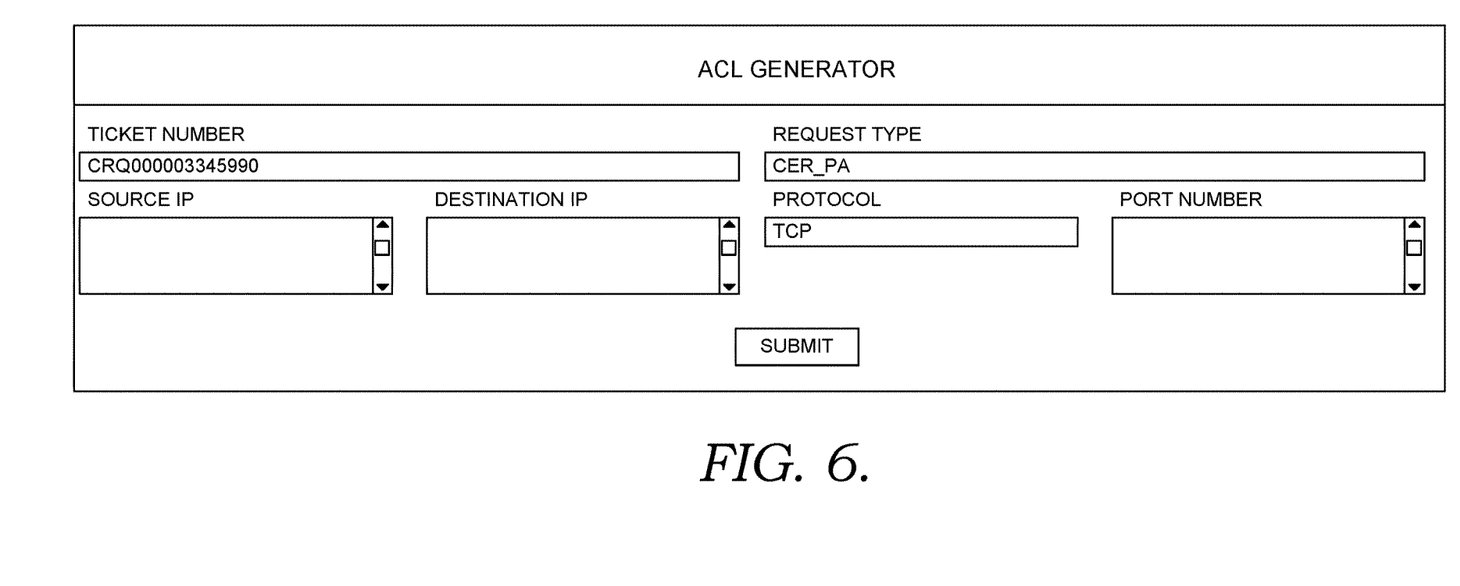
Figure 7:
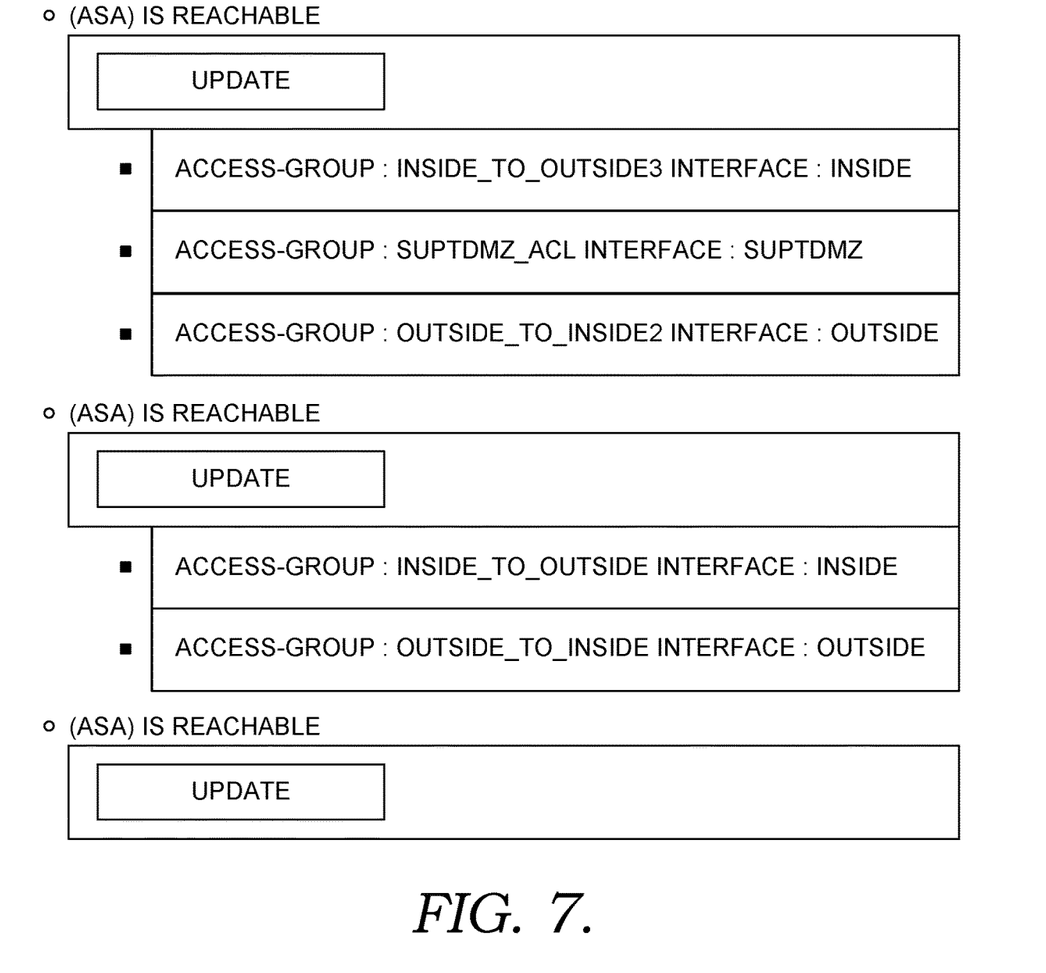

For example, if a destination IP address is to be added to the ACL for a server (source IP address) in the data center, inventory management module 110 automatically begins at the source IP address, toward the destination IP address and navigates through the data center mapping structure until it reaches a firewall. The route begins with the source IP address and may travel through other hardware, including ports, switches, load balancers, and routers, before reaching a firewall. For example, with reference to FIG. 2, if the source IP address is for server 1 and the destination address is client 1, the inventory management module would begin at server 1 navigating to client 1 and tracing the route through the data center before reaching firewall 1. In this example, the firewall 1 is the outbound firewall for the source IP address and destination IP address. FIG. 5 depicts a graphical user interface for interacting with the modules of platform 102. Destination IP and source IP addresses, along with port information and permissions, may be entered by a user in FIG. 6. Alternatively, this information may be sent directly to platform 102. FIG. 7 is a graphical user interface identifying one or more firewalls associated with the source IP address and destination IP addresses. It will be appreciated that while the platform 102 communicates with an engineering team via graphical user interfaces, such as FIGS. 5, 6, and 7, tracing the route from a source IP address to a destination IP address is performed automatically by platform 102 along with ACL rule generation in the proper syntax.

If both inbound and outbound ACLs for a destination and source IP address need to be changed or updated, the inventory management module 110 reverses the process and, utilizing the data center mapping structure stored in electronic storage database 122, begins traversing the data center mapping structure starting at the destination IP address (client 1) toward the source IP address (server 1). In this example, the firewall 1 is the inbound firewall for the source IP address and destination IP address. It will be appreciated that the outbound and inbound firewalls may be different and grant different levels of permission depending on whether the communication is inbound or outbound. For example, with reference to FIG. 2, clients 1 and 2 may both have the same permissions to view outbound data from server 1. However, client 1 may have higher level permission than client 2 to edit and configure data on server 1.

Once inventory module 110 determines the one or more firewalls to configure the ACL ruleset by traversing the data center mapping structure, generator module 112 accesses the syntax and configuration information for the one or more identified firewalls and client rules and preferences from electronic storage 122. Generator module 112 utilizes the syntax and client rules and preferences to generate the ACL rules for the identified firewall to provide or deny communication access. The generator module 112 is vendor-agnostic and automatically generates and codes the ACL rules in the proper syntax for the one or more identified firewalls. For example, if the identified firewall is a Palo Alto® firewall, version 1, generator module 112 accesses the proper syntax from the electronic storage 122 and generates the ACL rule in the proper syntax for the identified firewall. If the identified firewall is a Cisco® ASA firewall with update 10.0, generator module 112 generates the ACL in a different syntax compatible with the vendor and update version of the Cisco® ASA firewall. The ACLs are configured automatically by generator module 112, utilizing the data received by IT service module 108 for the firewall identified by inventory management module 110. Generator module 112 deploys and stores the ACL rules for the identified firewall on the necessary hardware within data center 205. Once the ACL rules are deployed, communication of data between the data center and client is sent and permitted according to the ACL rules.

Logging and audit module 114 saves a copy of the rules for the ACL for the identified firewall for future auditing purposes in electronic storage 122. The ACL rules and time and date information for the identified firewall being changed or updated is stored in electronic storage 122. This information is utilized for security audit compliance, tracking requests, and performing analytics for the data center 205.

Simulation module 116 simulates packet flow through the firewall after the ACL rules have be deployed for the identified firewall. This allows platform 102 to evaluate whether the ACL rulesets deployed are properly allowing communication to and from clients with the data center. Simulation module 116 may be implemented before a "go-live" with a new client or updates with a current client to make sure that the communication and client rules and preferences are executing properly before real-time use by a client. Simulation module 116 simulates the source IP address, the destination IP address, and data packets originating at the source IP address to the destination IP address and vice versa. Simulation module 116 tracks whether the simulated data packs have traveled through the networked data center from the simulated source IP address to the simulated destination IP through the data center mapping structure.

Figure 3:
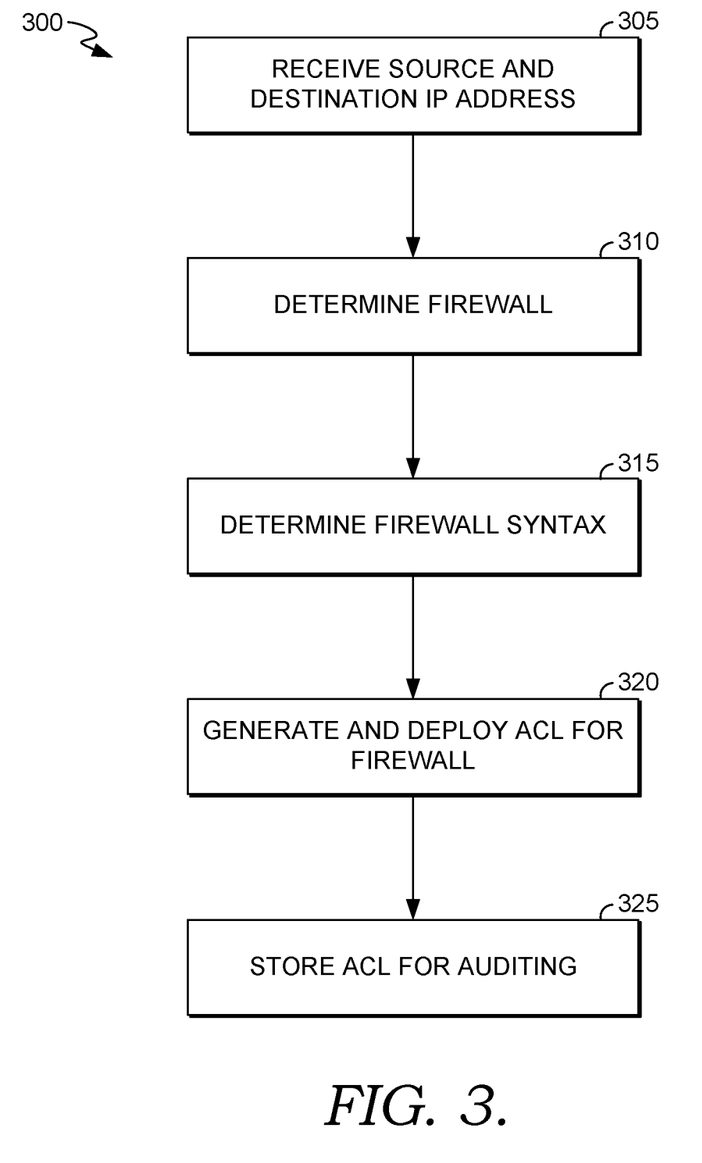
FIG. 3 depicts a flow chart for generating and deploying an ACL for an identified firewall, in accordance with aspects of the invention.
Figure 4:
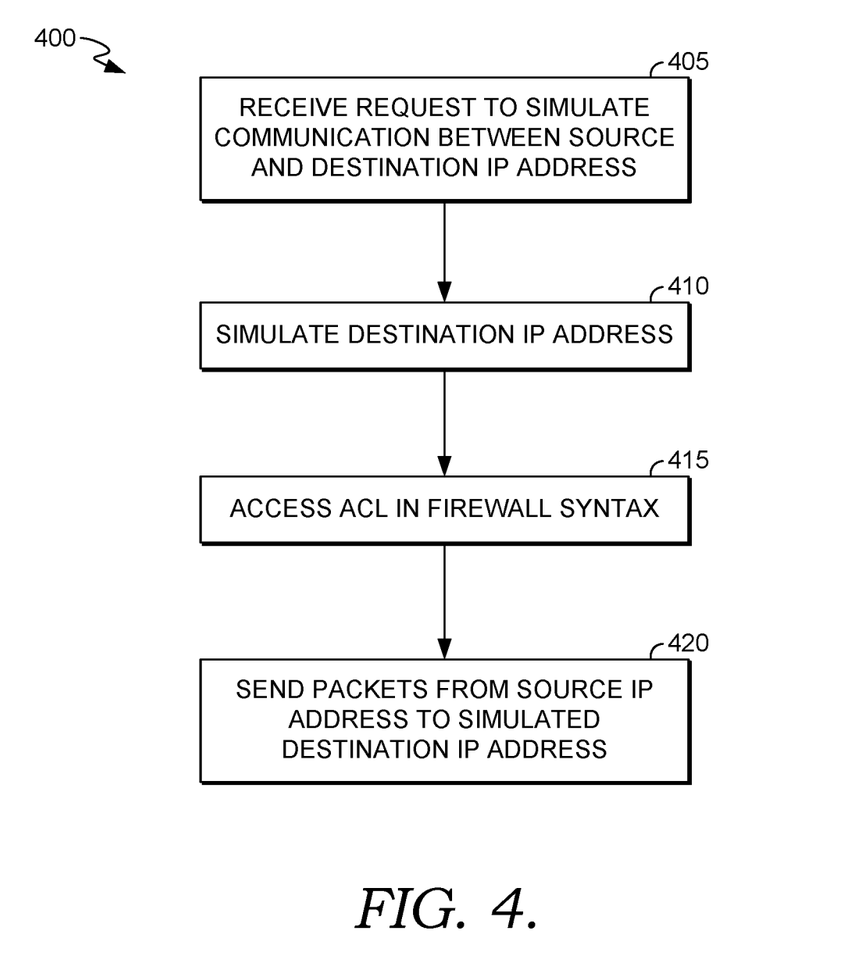
FIG. 4 depicts a flow chart for simulating flow through an updated firewall, in accordance with aspects of the invention.

Methods are provided for receiving source and destination IP addresses and identifying the associated firewall. Methods are also provided for simulating updates to ACL rules for an identified firewall. In some implementations, methods 300 and 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 300 and 400 in response to instructions stored electronically on an electronic storage medium. The one or more processing devices may include one or more devices configured through hardware, firmware, and/or software to be specifically designed for execution of one or more of the operations of method 300 and 400. Methods 300 and 400 may be performed by one or more hardware processors configured by machine-readable instructions, including modules described in FIG. 1, in accordance with one or more implementations.

FIG. 3 illustrates a method 300, in accordance with one or more implementations for automatically generating and deploying an ACL for a firewall in a data center. Operation 305 receives a destination and a source IP address and related permissions. Operation 305 receives data to add a client, delete a client, and/or update an ACL and includes the source IP address, destination IP address, layer, permissions, and port information. The data, including the source IP address and destination IP address, may be transmitted by an IT service module automatically or may be extracted from an infrastructure request ticket by a programming engineer and entered in the platform. Operation 310 determines the one or more firewalls associated with the source IP address and destination IP address. Operation 310 traverses a data center mapping structure starting at the source IP address toward the destination IP address until reaching a firewall. The route begins with the source IP address and may travel through other hardware, including ports, switches, load balancers, and routers, in the data center mapping structure before reaching a firewall.

Operation 315 determines the syntax for the identified firewall. For example, the firewall syntax may vary based on vendor, updates, and versions of the hardware firewall. Operation 320 utilizes the firewall syntax and client rules and preferences to generate the ACL rules for the identified firewall to provide or deny communication access. Operation 315 is vendor-agnostic and automatically generates and codes the ACL rules in the proper syntax for identified firewalls for multiple vendors. Operation 320 deploys the generated ACL rules in the data center to facilitate communications between the source IP address and destination IP address and provides the permissions. As such, permitted communications between the source IP address in the data center and the destination IP address are now operable. Operation 325 stores the generated ACL ruleset along with time and date information when generated for auditing purposes. For example, if the data center is going through an SOC Audit Requirement/Compliance, the additions, deletions and updates to multiple ACLs for multiple firewalls in the data center may easily be reviewed as all changes to security are clearly documented and saved by the platform at the time of generating the ACL rules. If an ACL and/or firewall are updated multiple times, this is documented by operation 325 along with the time and date and any other related information for each update to an ACL and/or firewall.

FIG. 4 illustrates a method 400, in accordance with one or more implementations for simulate data flow between a source IP address and a destination IP address after the ACL rules have been updated by the platform. Operation 405 receives a request to simulate data packet flow between a source IP address and a destination IP address after updating the ACL. Operation 410 simulates the destination IP address. Operation 415 accesses the syntax for the one or more firewalls between the source and destination IP addresses. Operation 420 sends data packets from the source IP address to the simulated destination IP address to see if the source IP address and simulated destination IP addresses are properly communicating and the destination IP address (client) has proper access to the data center.

In one embodiment, the destination IP address is simulated, however, it will be appreciated that the platform can simulate both the source IP address and destination IP address, along with a simulated data center based on the data center mapping structure and simulated data packets are communicated in the simulated environment. This may be done for actual testing in the data center with a simulated destination IP address. If the simulations detect that communications are not occurring properly in a simulation, the necessary changes and adjustments are made to ACLs for the one or more firewalls before "going live" in real communications between a client and the data center. This helps prevent costly mistakes when active data is being communicated between a client and the data center.

Computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access system 100 via remote platform(s) 104.

In some implementations, computing platform(s) 102, remote platform(s) 104, and/or external resource(s) 120 may be operatively linked via one or more electronic communication links. For example, such electronic communication links may be established, at least in part, via a network, such as the Internet and/or other networks. It will be appreciated that this is not intended to be limiting, and the scope of this disclosure includes implementations in which computing platform(s) 102, remote platform(s) 104, and/or external resource(s) 120 may be operatively linked via some other communication media.

A given remote platform 104 may include one or more processors configured to execute computer program modules. The computer program modules may be configured to enable an expert or user associated with the given remote platform 104 to interface with system 100 and/or external resource(s) 120, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, a gaming console, and/or other computing platforms.

External resources 120 may include sources of information outside of system 100, external entities participating with system 100, and/or other resources.

Computing platform(s) 102 may include electronic storage 122, one or more processors 124, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 122 may comprise non-transitory storage media that electronically stores information. The electronic storage media of electronic storage 122 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from computing platform(s) 102, information received from remote platform(s) 104, and/or other information that enables computing platform(s) 102 to function as described herein.

Processor(s) 124 may be configured to provide information processing capabilities in computing platform(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device or processor(s) 124 may represent processing functionality of a plurality of devices operating in coordination. Processor(s) 124 may be configured to execute modules 108, 110, 112, 114, and/or 116, and/or other modules. Processor(s) 124 may be configured to execute modules 108, 110, 112, 114, and/or 116, and/or other modules by software; hardware; firmware; some combination of software, hardware, and/or firmware; and/or other mechanisms for configuring processing capabilities on processor(s) 124. As used herein, the term "module" may refer to any component or set of components that perform the functionality attributed to the module. This may include one or more physical processors during execution of processor readable instructions, the processor readable instructions, circuitry, hardware, storage media, or any other components.

Although the present technology has been described in detail for the purpose of illustration based on what is currently considered to be the most practical and preferred implementations, it is to be understood such detail is solely for that purpose and the technology is not limited to the disclosed implementations, but, on the contrary, is intended to cover modifications and equivalent arrangements that are within the spirit and scope of the appended claims. For example, it is to be understood the present technology contemplates that, to the extent possible, one or more features of any implementation can be combined with one or more features of any other implementation.

The invention claimed is:

1. A computer-implemented method, comprising:
   identifying, with respect to a data center, a data center mapping structure in an electronic storage database, the data center mapping structure comprising a map of the data center, wherein the map of the data center comprises one or more of: firewalls, routers, or servers, in the data center;
   receiving a request to implement a network security configuration, the request comprising a source IP address and a destination IP address; and
   responsive to the request, implementing the network security configuration using automatically identified firewalls, at least by:
      utilizing the data center mapping structure to determine a route from the source IP address toward the destination IP address to automatically identify one or more firewalls, along the route, that are comprised in the data center mapping structure;
      in response to automatically identifying the one or more firewalls along the route from the source IP address toward the destination IP address, determining a syntax for the one or more firewalls; and
      automatically generating and deploying, utilizing a computer processor, one or more access control list (ACL) rules in the syntax for the one or more firewalls to implement the network security configuration in accordance with the request.

2. The method of claim 1, further comprising:
   causing the computer processor to perform the one or more ACL rules.

3. The method of claim 1, further comprising:
   receiving security permissions associated with the source IP address and the destination IP address.

4. The method of claim 3, wherein the security permissions include one or more of: adding a first IP address to an ACL, deleting a second IP address from the ACL, or updating a permission level fora third IP address associated with the ACL.

5. The method of claim 1, further comprising:
   storing the one or more ACL rules for the one or more firewalls and associated time and date when the one or more ACL rules were generated.

6. The method of claim 1, further comprising:
   simulating data packet flow from the source IP address to the destination IP address via the one or more firewalls with the one or more ACL rules generated to verify communication between the source IP address and the destination IP address.

7. The method of claim 1, wherein the one or more firewalls comprise a first firewall and a second firewall, and wherein the syntax is different as between the first firewall and the second firewall.

8. A system for generating and deploying one or more access control list rules, the system comprising:
   a computing device having one or more processors and one or more computer-storage media; and
   a data store in communication with the computing device;
   wherein the one or more computer-storage media comprise computer-executable instructions that, when executed by the one or more processors, cause the computing device to perform operations, comprising:
      identifying, with respect to a data center, a data center mapping structure in an electronic storage database, the data center mapping structure comprising a map of the data center, wherein the map of the data center comprises one or more of: firewalls, routers, or servers, in the data center;
      receiving a request to implement a network security configuration, the request comprising a source IP address and a destination IP address; and
      responsive to the request, implementing the network security configuration using automatically identified firewalls, at least by:
         utilizing the data center mapping structure to determine a route from the source IP address toward the destination IP address to automatically identify one or more firewalls, along the route, that are comprised in the data center mapping structure;
         in response to automatically identifying the one or more firewalls along the route from the source IP address toward the destination IP address, determining a syntax for the one or more firewalls;
         automatically generating and deploying one or more access control list (ACL) rules in the syntax for the one or more firewalls; and
         causes a computer processor to perform the one or more ACL rules to implement the network security configuration in accordance with the request.

9. The system of claim 8, wherein the operations further comprise:
   receiving security permissions associated with the source IP address and the destination IP address.

10. The system of claim 9, wherein the security permissions include one or more of: adding a first IP address to an ACL, deleting a second IP address from the ACL, or updating a permission level for a third IP address associated with the ACL.

11. The system of claim 8, wherein the operations further comprise:
    storing the one or more ACL rules for the one or more firewalls and associated time and date when the one or more ACL rules were generated.

12. The system of claim 8, wherein the operations further comprise:
    simulating data packet flow from the source IP address to the destination IP address via the one or more firewalls with the one or more ACL rules generated to verify communication between the source IP address and the destination IP address.

13. The system of claim 8, wherein the one or more firewalls comprise a first firewall and a second firewall, and wherein the syntax is different as between the first firewall and the second firewall.

14. One or more non-transitory computer-storage media having computer executable instructions embodied thereon, that when executed by one or more computer processors, cause the one or more computer processors to perform operations, comprising:
    identifying, with respect to a data center, a data center mapping structure in an electronic storage database, the data center mapping structure comprising a map of the data center, wherein the map of the data center comprises one or more of: firewalls, routers, or servers, in the data center;
    receiving a request to implement a network security configuration, the request comprising a source IP address and a destination IP address; and
    responsive to the request, implementing the network security configuration using automatically identified firewalls, at least by:
       utilizing the data center mapping structure to determine a route from the source IP address toward the destination IP address to automatically identify one or more firewalls, along the route, that are comprised in the data center mapping structure;

in response to automatically identifying the one or more firewalls along the route from the source IP address toward the destination IP address, determining a syntax for the one or more firewalls; and automatically generating and deploying one or more access control list (ACL) rules in the syntax for the one or more firewalls to implement the network security configuration in accordance with the request.

15. The media of claim 14, wherein the operations further comprise:

receiving security permissions associated with the source IP address and the destination IP address.

16. The media of claim 15, wherein the security permissions include one or more of: adding a first IP address to an ACL, deleting a second IP address from the ACL, or updating a permission level for a third IP address associated with the ACL.

17. The media of claim 14, wherein the operations further comprise:

storing the one or more ACL rules for the one or more firewalls and associated time and date when the one or more ACL rules were generated.

18. The media of claim 14, wherein the operations further comprise:

simulating data packet flow from the source IP address to the destination IP address via the one or more firewalls with the one or more ACL rules generated to verify communication between the source IP address and the destination IP address.

19. The media of claim 14, wherein the one or more firewalls comprise a first firewall and a second firewall, and wherein the syntax is different as between the first firewall and the second firewall.

20. The media of claim 19, wherein the first firewall is associated with a first vendor and the second firewall is associated with a second vendor.

21. The media of claim 14, wherein the operations are firewall-vendor agnostic.

22. The media of claim 14, wherein the operations further comprise:

automatically discovering a set of firewalls in the data center, wherein the set of firewalls comprises the one or more firewalls along the route from the source IP address toward the destination IP address; and generating the data center mapping structure based at least in part on the set of firewalls having been automatically discovered in the data center.

23. The media of claim 22, wherein the operations further comprise:

automatically collecting firewall code information from at least some firewalls from among the set of firewalls; and generating and deploying the one or more ACL rules based on the firewall code information.

24. The media of claim 14, wherein the operations further comprise:

automatically detecting a firewall infrastructure change in the data center; and updating the data center mapping structure based at least in part on the firewall infrastructure change.

25. The media of claim 14, wherein the operations further comprise:

generating, based on the data center mapping structure, at least one of a simulated source IP address or a simulated destination IP address; and testing the one or more ACL rules in the data center using the at least one of the simulated source IP address or the simulated destination IP address.

26. The media of claim 14, wherein the operations further comprise:

performing the one or more ACL rules.

* * * * *